Nov. 24, 1964     B. T. VIG     3,158,375
PORTABLE MATERIAL SPREADER
Filed Jan. 21, 1963     2 Sheets-Sheet 1
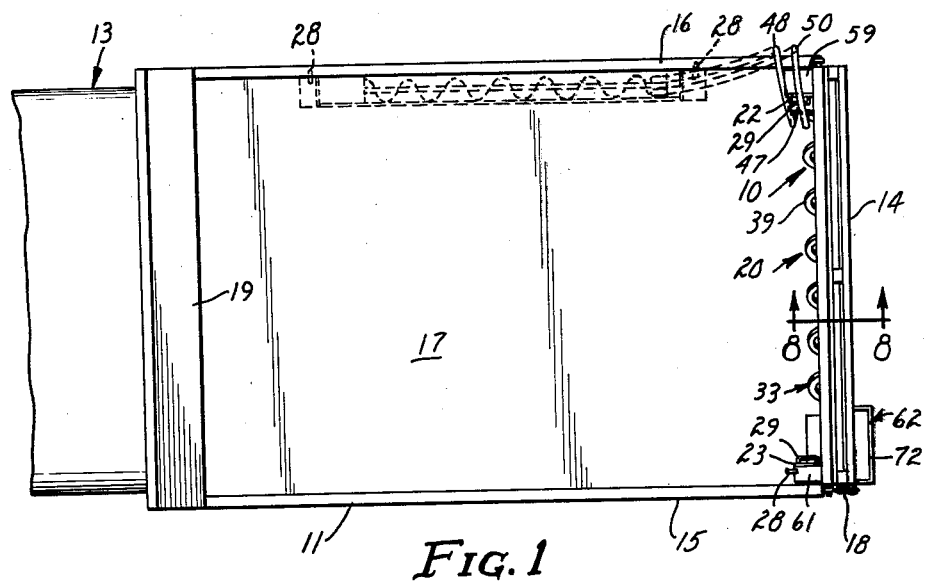
FIG. 1
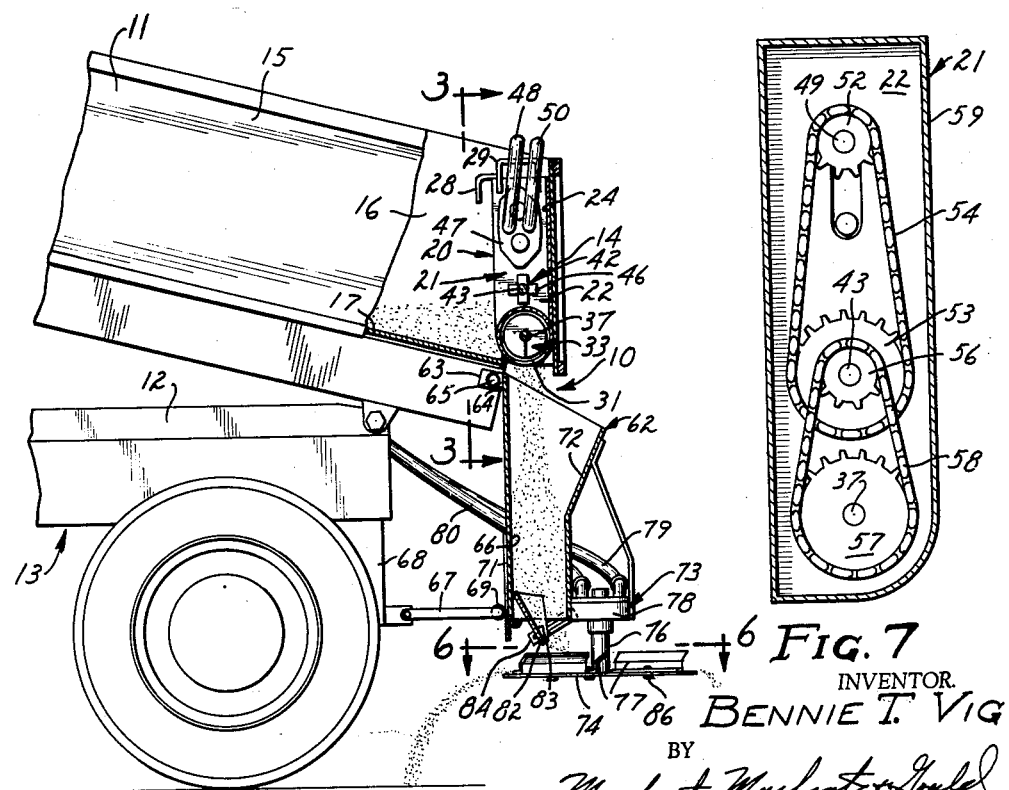
FIG. 2
FIG. 7
INVENTOR.
BENNIE T. VIG
BY Merchant, Merchant & Gould
ATTORNEYS Nov. 24, 1964     B. T. VIG     3,158,375
PORTABLE MATERIAL SPREADER
Filed Jan. 21, 1963     2 Sheets-Sheet 2

INVENTOR.
BENNIE T. VIG
BY
Merchants, Merchant & Gould
ATTORNEYS

United States Patent Office 3,158,375
Patented Nov. 24, 1964

3,158,375
PORTABLE MATERIAL SPREADER
Bennie T. Vig, 413 W. 3rd St., Willmar, Minn.
Filed Jan. 21, 1963, Ser. No. 252,898
3 Claims. (Cl. 275—8)

This invention relates to a new and very useful improvement in material spreaders for intsallation in trucks and the like.

More particularly, this invention is directed to a material spreader whose feed mechanism is adapted either to be mounted on the inside of an upfolding tailgate across the rear end of a truck dump box for functional cooperation therewith in a material spreading operation, or to be folded out of the way within the truck body as in a longitudinal position against the dump box side wall for storage when out of use.

It is an object of this invention to provide a relatively simple, reliable material spreader, which can be operated from a remote location such as from a driver's cab, for sand, chips, salt, and the like, for installation on dump trucks so as to permit the distribution of such materials upon streets and highways to control ice and snow conditions.

It is another object of this invention to provide a device of the class described wherein the feeding unit is mountable upon the face of a downfolding tailgate on a dump box, which provides a machine operative position, and which can be pivoted 90° and mounted against the longitudinal inside face of a side wall of such dump box for storage when not in use, all parts otherwise remaining in an operative condition, thereby enabling one to readily and simply switch the use of a truck from material spreading to load carrying and vice versa, as the need arises and also eliminating storage and handling problems heretofore associated with prior art material spreading equipment.

It is another object of this invention to provide a material spreader having a combined hopper spreading spinner assembly so dependably mounted upon the outside rear end of a truck dump box as to maintain a generally vertical axis independently of the angle of inclination of the floor of the dump box, thereby enabling such assembly to spread and evenly distribute materials within a radius up to thirty or more feet from the spinner.

It is another object of this invention to provide a foldable feed mechanism in the form of a frame transversely mounted on the inside of a regular tailgate and holding vertically spaced, transversely extending, ribbon-type feed auger and lug-type delumper bar such auger and such delumper bar being adapted for respective rotational movements about their individual axes by drive means mounted at one end of such frame, such feed mechanism thereby being adapted for moving a load of material in a dump truck box to be spread longitudinally along such dump box floor to the entrance of a hopper depending from one corner of the truck box as such bed is progressively and gradually inclined when the feed mechanism operates.

The above and still further objects of my invention will become apparent from the following detailed specification, appended claims and attached drawings.

Referring to the drawings, wherein like characters indicate like parts throughout the several views:

FIG. 1 is a top plan view of a truck bed outfitted with an embodiment of the material spreader of the invention, the dotted lines showing the position of the spreader when not in use during storage;

FIG. 2 is a side elevational view of the embodiment shown in FIG. 1, some parts thereof broken away and some parts shown in section;

FIG. 7 is a vertical sectional view taken along the line 7—7 of FIG. 3, some parts removed.

Figure 3:
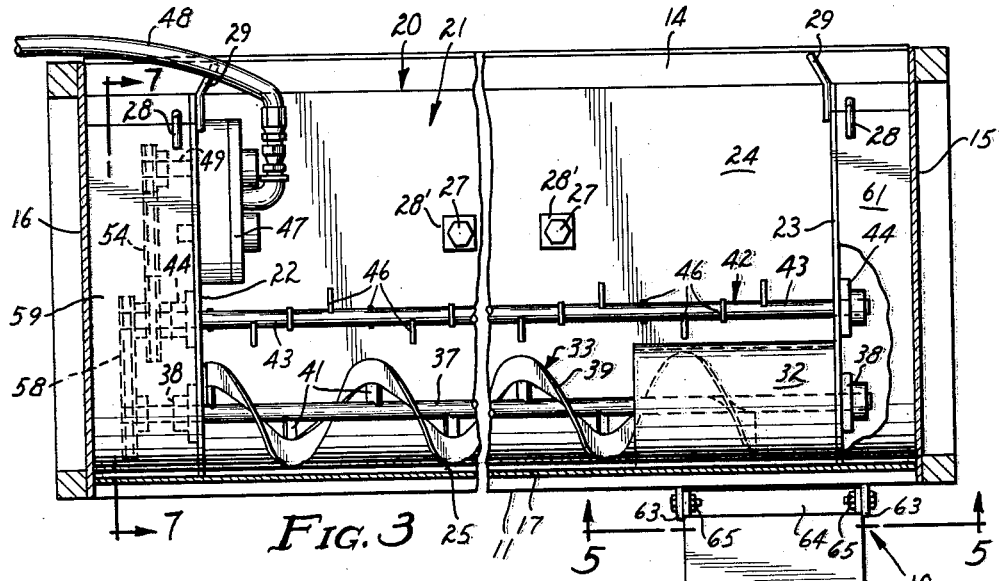
FIG. 3 is a sectional view taken along the line 3—3 of FIG. 2.

Referring to the drawings, there is seen in FIG. 1 an embodiment of a material spreader of the invention herein designated in its entirety by the numeral 10. The spreader is seen to be associated with a wagon box 11 which is mounted upon the frame 12 of a conventional wheeled vehicle, here shown as a conventional and commercially available dump truck 13 (not shown in full). As is customary in such vehicles the wagon box 11 is mounted upon the frame 12 for pivotal movements of the wagon box 11 at the rear of the frame 12 between a horizontal position and an inclined position. Such pivotal movements are conventionally controlled by the driver of the vehicle from the cab of a truck 13 or the like, conventional hydraulic or mechanical means (not shown). As such vehicles are well-known to the art and do not constitute a part of this invention, no further description thereof is given herein.

Figure 4:
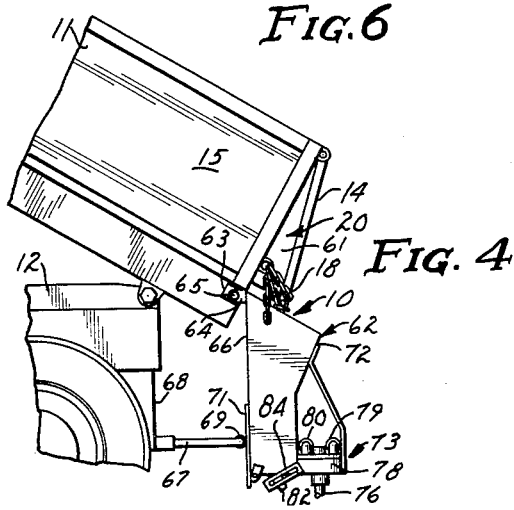
FIG. 4 is a side elevational view of the embodiment shown in FIG. 1 showing the manner of retaining the tailgate in position with the spreader in operation.

The wagon box 11 has a floor 17, opposed side walls 15 and 16, a forward wall 19, and a tailgate 14. The tailgate 14 is pivotally connected at its upper end to the rear end of each side wall 15 and 16 for limited opening and closing movements of the lower edge of the tailgate 14 toward and away from the rear end of the floor 17 of wagon box 11. In the embodiment shown, opening and closing movements of the tailgate 14 are limited in extent as desired by means of a chain 18 (see FIG. 4) and associated connecting elements, the chain 18 being positioned between the lower end of tailgate 14 and the lower rear end of the side wall 15, though those skilled in the art will appreciate that any conventional means can be used to limit the pivotal opening and closing movements of the lower edge of the tailgate 14.

When material spreader 10 is operative, there is mounted against the inside wall of tailgate 14 a material feeding device, herein designated in its entirety by the numeral 20. The material feeding device 20 has a frame 21 which has opposed side walls 22 and 23, a rear wall 24, and a bottom 25. In the embodiment shown, the bottom wall 25 is cross-sectionally arcuate.

Means is provided for selectively detachably mounting the frame 21 in an operative position on the tailgate 14, and in an inoperative storage position on one of the side walls, here adjacent side wall 16. While any conventional mounting means can be used, this embodiment employs, for mounting the frame 21 detachably against the tailgate 14, a pair of carriage bolts 27. These bolts 27 extend through rear wall 24 and screw into nuts (not shown) mounted in the tailgate 14. In the region of the rear wall 24 through which bolts 27 extend are welded a pair of slugs 28″, one over each bolt hole for reinforcing purposes. For detachably mounting the frame 21 in an inoperative storage position against the inside face of side wall 16, there is provided a pair of hooks 28 which are rigidly attached to the frame 21 and which project inwardly from the frame 21 into the interior of the wagon box 11 when the device 20 is in an operative position on tailgate 14. The hooks 28 each engage an eye appropriately in the top side edge of side wall 16 so that device 20 depends from side 16 when hooks 28 are so engaged.

It will be observed that the width of the side walls 22 and 23 are generally equal to each other and is so chosen that the entire working parts of the material feeding device 20 is contained therewithin. Thus, when the material feeding device 20 is mounted in an inoperative storage position against side wall 16, the entire material feeding device 20 lies flat against such side wall 16 and only the rear wall 24, side walls 22 and 23, and bottom wall 25 of frame 21 are exposed to the interior of the wagon box 11 during storage of the material feeding device 20 within the wagon box 11. To move the material feeding device 20 from its operative position upon tailgate 14 to its inoperative position upon the side wall 16, there is provided a pair of handles 29, one positioned at each end of the frame 21, so that, by positioning one man by each such handle 29, the entire material feeding device 20 is simply swung from the tailgate 14 (when disengaged therefrom) to the side wall 16 and the hooks 28 engaged therewith. Actually, the changing of device 20 from an operative to an inoperative position can be accomplished by only a single man.

It will be observed that when frame 21 is in its operative position, its rear wall 24 is in face to face engagement with the inner surface of tailgate 14, and that its bottom wall 25 is in close proximity to the floor 17 of wagon box 11. When the tailgate 14 is at its limit of opening movement, the bottom wall 25 has its forward edge portion generally overlying the rear edge portion of the floor 17.

The bottom wall 25 has a discharge opening 31 near one end adjacent side wall 23 of frame 21. This discharge opening 31 is disposed rearwardly of floor 17 when the tailgate 14 is at its limit of opening movement. The frame 21 is so constructed that, when it is in its operative position against tailgate 14, and the tailgate 14 is at its limit of opening movement, little or no material in a wagon box 11 can discharge therefrom except through the discharge opening 31.

Included as a part of frame 21 is a hood portion 32 which overlies the discharge opening 31, and preferably, as in the embodiment shown, extends a short distance laterally therefrom toward the midregion of the wagon box 11. This hood portion 32 is so constructed as to have but a single aperture between the interior of the wagon box 11 and the discharge opening 31, and this aperture is preferably so dimensioned that, taken together with frame 21 and bottom wall 25, it is generally circular in extent and approximately equal to the diameter of the flight of feed auger 33.

Figure 5:
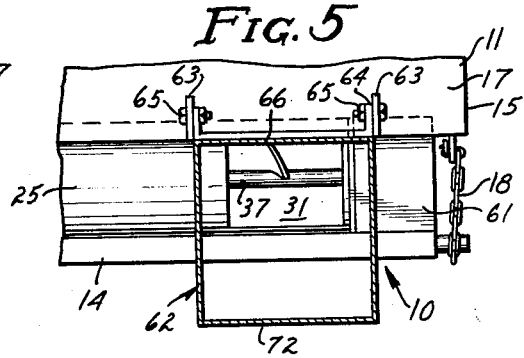
FIG. 5 is a horizontal sectional view taken along the line 5—5 of FIG. 3, showing the appearance of the hopper used in the embodiment of FIG. 1.
Figure 8:
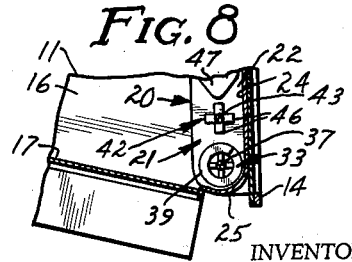
FIG. 8 is a sectional view taken along the line 8—8 of FIG. 1.

It is to side walls 22 and 23 that moving parts of the material feeding device 20 are generally secured. Transversely extending between side walls 22 and 23 of frame 21 adjacent wall 25 is a feed auger 33. The shaft portion 37 of feed auger 33 is journalled in sealed bearings 38 (paired) near its end regions in respective side walls 22 and 23 for rotational movements. The flight 39 of feed auger 33 lies entirely between the side walls 22 and 23 in frame 21. It has been found convenient, as in the embodiment shown in the drawings, to have the flight 39 extend not beyond the middle of the discharge opening 31 (see FIG. 5). It has also been found convenient, as in the embodiment shown, to have the flight 39 of feed auger 33 to be of the ribbon type, except in that portion of the flight 39 which is in proximity to the hood portion 32. As those skilled in the art will appreciate, in ribbon type feed augers, the flight is continuous only in the radial outer portions of its spiral turns, the inner portions being generally spaced from and separated from the shaft portion 37 of the feed auger 33, except for necessary supporting members 41. A ribbon type feed auger has been found to be generally advantageous in preventing undesirable compaction of feed materials against the frame 21, thereby interfering with the operation of the material feeding device 20. By having the flight 39 continuous in the region of the hood portion 32, it has been found that a desirable shuttering action is achieved whereby material is fed from the wagon box 11 to and through the discharge opening 31 only during rotation of the feed auger 33 (the direction of rotation, of course, in the embodiment shown, being such as to move material from the left to the right side of the wagon box 11 as shown, for example, in FIG. 3).

In overlying spaced relation to said feed auger 33 and said hood portion 32 is a transversely extending delumper bar 42. The delumper bar 42, as those skilled in the art will appreciate, serves to break up large clods or clumps of material to be fed through the discharge opening 31. The delumper bar 42 is generally of particular value when the material feeding device 20 is in use in below freezing temperatures. In the embodiment shown, the delumper bar 42 consists of a shaft portion 43 which is positioned so as to be generally parallel to the shaft 37 of feed auger 33 and which extends between the side walls 22 and 23, respectively, being journalled in these side walls 22 and 23 for rotational movements by means of sealed bearings 44 (paired). To aid the delumper bar 42 in carrying out its function, the shaft 43 is equipped at regularly spaced intervals with a plurality of radially extending lugs 46 which are adapted to impact with and break up material lumps coming in contact with the delumper bar 42 while it is rotating in device 20.

While any conventional means can be used for imparting rotation to the feed auger 33 and to the delumper bar 42, the embodiment shown employs a hydraulic motor 47 of the conventional type wherein, when hydraulic fluid under pressure is fed thereto, as through hose 48 (see FIG. 2), a shaft 49 is caused to rotate. Thereafter, the hydraulic fluid is conducted away from such motor 47 as through a hose 50. As the construction and operation of such motors is entirely conventional and does constitute a part of this invention, no further description thereof is given herein. Conveniently, however, the controls governing the operation of the hydraulic motor 47 are placed where the driver of the vehicle 13 can manually control them while operating the vehicle 13.

The arrangement used to hook the shaft 49 of hydraulic motor 47 to the shaft 37 of feed auger 33 and the shaft 43 of delumper bar 42 is as follows: The small diameter drive sprocket 52 is mounted on shaft 49. A larger sprocket 53 is mounted on shaft 43, thereby achieving a reduction in the speed of rotation of shaft 43 as compared to shaft 49 when shaft 49 and shaft 43 are interconnected by means of a drive chain 54. Then, to drive shaft 37 a drive sprocket 56 (similar to sprocket 52) is mounted on the end shaft 43 and, in line therewith, there is mounted on shaft 37 a large sprocket 57 (similar to sprocket 53), and then sprocket 56 and 57 are interconnected by means of a drive chain 58.

To keep the sprockets and chains, as well as the bearings 38 and 44, free from possible contamination from material in the wagon box 11, a drive mechanism cover 59 is provided. The dimensions of the drive mechanism cover 59 are such as to extend the width of the material feeding device 20 laterally from side wall 22 to side wall 16 of wagon box 11. Similarly, and for the same purpose, there is provided a bearing cover 61 for the opposite end of the material feeding device 20. This bearing cover 61, then, serves to keep material from contaminating the bearings 44 and 38 and also serves to extend the width of the material feeding device 20 from the side wall 23 to the side wall 15 of wagon box 11. The drive mechanism cover 59 and the bearing cover 61 are secured, respectively, to side wall 22 and side wall 23 by use of machine bolts and nuts which extend through respective side walls 22 and 23 and into appropriate threaded apertures formed by inturned flanges on the walls of the respective drive mechanism cover 59 and bearing cover 61.

Positioned beneath the discharge opening 31 is the mouth of a hopper 62. The hopper 62 is mounted upon the wagon box 11 by means of a pair of support arms 63 which project vertically downwardly from the rear end of the wagon box 11, the space between the support arm 63 corresponding to the distance between a pair of swing arms mounted on the hopper 62, as shown, for example, in FIG. 5. By securing each swing arm 64 to a support arm 63 by means of a nut and bolt assemblies 65 (paired), the hopper 62 is dependably mounted upon the wagon box 11 for pivotal movements. The forward wall 66 of hopper 62 is maintained in a generally vertical position independently of the angle of inclination of the wagon box 11 by mounting a rearwardly projecting, horizontally extending spacer arm 67 from the frame 12 of dump truck 13 as by securing the spacer arm 67 to a vertically mounted leg 68 (i.e., leg 68 being mounted at its upper end to the frame 12 and at its lower end to the spacer arm 67). The rearward end of the spacer arm 67 is suitably equipped with a roller 69 having a generally transversely extending axis. The roller 69 contacts a plate 71 mounted on the forward wall of the hopper 62. Then, as the wagon box 11 inclines, and the plate 71 moves against the roller 69, the hopper 62 is caused to pivot about the bolt 65, thereby maintaining the hopper 62 in a continuously vertical position independently of the angle of inclination of the wagon box 11, as desired.

Dependably mounted from the rear wall 72 of hopper 62 is a material spreader spinner mechanism, herein designated in its entirety by the numeral 73. The material spreader assembly 73 consists of a spinner 74 which is circular in shape and axially mounted upon a drive shaft 76. Radially positioned upon the top face of spinner 74 are a plurality of generally upstanding fins 77 whose upper edges are generally formed into vanes for better functional efficiency in spreading material deposited upon the face of the rotating spinner 74. The drive shaft 76 is directly connected with a hydraulic motor 78. Hydraulic motor 78, like hydraulic motor 47, is conventional in design and no description of its operation or construction need be given here since it does not constitute a part of this invention. Each fin 77 is held to spinner 74 by a bolt 86.

The hydraulic motor 78 is conveniently driven as by means of hydraulic fluid entering the motor 78 as through a hose 79, the extent of fluid being led away as through a hose 80. In the device shown in the embodiment of the drawings, the fluid effluent from hydraulic motor 47 is used to drive hydraulic motor 78.

The shaft 76 is vertically mounted in relation to the vertical forward wall 66 of hopper 62. Since this forward wall 66 is maintained in a generally vertical position independently of the angle of inclination of the wagon box 11, the hydraulic motor 78, shaft 76, and spinner 74 are all maintained in the desired relationship, one to another. Thus, the material spreader spinner assembly 73 and the hopper 62 coact for maximum efficient distribution of material using the material feeding device 20.

The diameter of the spinner 74 is so chosen that, when mounted as described in relation to the hopper 62, the face of the spinner lies underneath the bottom of the hopper 62. In order to direct the material passing through the bottom of hopper 62 against the desired general point upon the face of the spinner 74 so as to achieve a predetermined radius of throw for material deposited upon the spinner 74 for a given number of revolutions of the spinner 74 per minute or second, there is provided a damper arrangement which regulates the direction of material flow through the bottom of the hopper 62. The damper 82 is generally rectangular in shape and is equipped with opposite side walls 83 (paired). The rear edge of the damper 82 is allowed to slidably engage the inside face of the forward wall 66 of hopper 62. The angle of incline of the damper 82 then controls the direction of material flow onto the face of the spinner 74. The damper 82 is maintained at a desired angle of inclination by means of lever arm 84. One end of lever arm 84 is rigidly secured to the side of the hopper 62. Into a longitudinally extending (as respects lever arm 84) slot in lever arm 84 is fitted a restraining screw (not shown) held in place by a suitable retaining nut (also not shown). By tightening the nut against the lever arm 84 upon the screw, it is convenient to fixedly set the angle of inclination for the damper 82 thereby achieving desired throw pattern for the hopper-spinner combined assembly.

Figure 6:
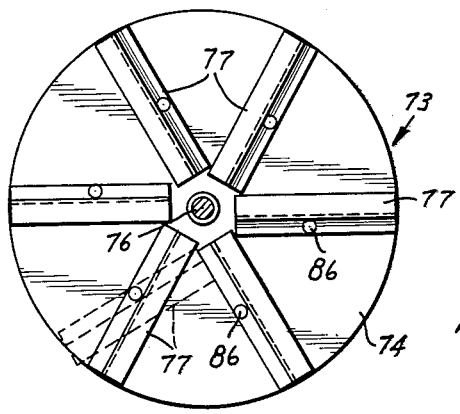
FIG. 6 is a horizontal sectional view taken along the line 6—6 of FIG. 2 showing the appearance of the spinner.

Those skilled in the art will appreciate that by employing a variable speed control for the hydraulic motors, or each of them as the case may be desired, it is possible to regulate the auger feed and speed of the spinner. The unit can be operated at any normal truck speed. By maintaining the spinner parallel to the highway at all times, the uniform distribution of material from the truck is obtained, and by making the spinner blades or fins adjustable (as by mounting the fins upon the spinner by means of a single nut, as shown in FIG. 6, a further control over the desired spread pattern of material is obtained. One man can easily handle conversion of the truck used for material spreading from a dump truck to a material spreading truck and vice versa. The spreader spinner assembly is left attached to the truck for operational use at all times. Because the feed mechanism is mounted inside the truck, there is no interference with the paint, particularly of the reflecting type commonly used on truck tailgates today.

In operation, a truck equipped with a material spreader of the invention can be driven at a normal truck operating speed along a public highway with the wagon box inclined at an angle sufficient to induce the tailgate to swing outwardly to its limit of outward movement. By initiating operation of hydraulic motors, material is spread to a desired extent continuously or discontinuously as desired on such highway.

My invention has been thoroughly tested and found to be completely satisfactory for the accomplishment of the above objects, and while I have shown and described a preferred embodiment, I wish it to be specifically understood that the same is capable of modification without departure from the spirit and scope of the appended claims.

I claim:

1. A material spreader for a vehicle having a frame, wheels supporting said frame, and a wagon box having a floor and opposed sides mounted on said frame for pivotal movements of the wagon box at the rear end of said frame between a horizontal position and an inclined position, said wagon box having a tail gate pivotally connected at its upper end to the rear end of each of said sides for limited opening and closing movements of the lower edge of said tail gate toward and away from the rear end of said wagon box, said material spreader comprising:

(a) a feeder frame including opposed side walls, a rear wall, and a cross-sectionally arcuate bottom wall, (b) means for detachably mounting said feeder frame to said tail gate within said wagon box for common opening and closing movements with said tail gate and with said rear wall in face-to-face relation to the tail gate and with said arcuate bottom wall overlying said wagon box floor when the tail gate is closed, (c) said arcuate bottom wall having a forward edge portion disposed in overlying engagement to a rear edge portion of said wagon box floor when said tail gate is at its limit of opening movement, (d) said arcuate bottom wall further having a discharge opening adjacent one end disposed rearwardly of said wagon box floor when said tail gate is at its limit of opening movement, (e) means cooperating with said rear wall and one of said side walls to provide a hood overlying said discharge opening to isolate said discharge opening from the wagon box and defining an opening spaced from said discharge opening, (f) a generally horizontally disposed feed auger closely overlying said arcuate bottom wall and including a shaft journalled in said feeder frame side walls and an auger flight a portion of which projects generally radially outwardly from said shaft, said auger flight portion extending through said hood opening, said auger flight terminating above the central portion of said discharge opening, (g) said auger flight portion being closely received in said hood opening and cooperating with said hood to prevent passage of material to said discharge opening when said feed auger is inoperative, (h) a rotary spreader element mounted on said vehicle frame independently of said feeder frame and in underlying relation to said discharge opening when said tail gate is open, to receive material delivered through said discharge opening, (i) and means for imparting rotary movements to said feed auger and rotary spreader element.

2. The structure defined in claim 1 in which said rotary spreader element comprises a generally horizontally disposed disk and a plurality of circumferentially spaced spreader fins, and means mounting said fins on the top surface of said disk for adjustment relative to said disk toward and away from radial alignment of said fins with the center of said disk.

3. The structure defined in claim 1 in further combination with a pair of downwardly opening hook elements on said feeder frame, said hook elements projecting forwardly from the upper end portion of said feeder frame for supporting said frame in a selected inoperative position on one of the sides of said wagon box with said auger disposed adjacent the inner surface of said one of the sides and said rear wall spaced from said inner surface.

References Cited in the file of this patent
UNITED STATES PATENTS

| | | |
|---|---|---|
| 1,101,174 | Gauntt | June 23, 1914 |
| 2,421,211 | Lutz | May 27, 1947 |
| 2,698,184 | Bowen | Dec. 28, 1954 |
| 2,967,056 | D'Amato | Jan. 3, 1961 |